United States Patent
Krawczyk et al.

(10) Patent No.: US 6,326,579 B1
(45) Date of Patent: Dec. 4, 2001

(54) METHODS AND APPARATUS FOR MACHINING A WORK PIECE

(75) Inventors: David M. Krawczyk, Montague; Charles L. Ball, Spring Lake, both of MI (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/369,207

(22) Filed: Aug. 5, 1999

(51) Int. Cl.$^7$ ...................................................... B23H 1/04
(52) U.S. Cl. ..................... 219/69.15; 219/69.12; 219/69.11; 219/69.14; 219/69.2
(58) Field of Search ............... 219/69.15, 69.12, 219/69.11, 69.14, 69.2

(56) References Cited

U.S. PATENT DOCUMENTS

| | | | | |
|---|---|---|---|---|
| 4,016,395 | * | 4/1977 | Rietveld | 219/69 V |
| 4,841,126 | * | 6/1989 | Greber | 219/69.2 |
| 5,744,775 | * | 4/1998 | Yasuda et al. | 219/69.12 |

* cited by examiner

Primary Examiner—M. Alexandra Elve
(74) Attorney, Agent, or Firm—Andrew C. Hess; V. Ramaswamy

(57) ABSTRACT

An electric discharge machine includes a machine base configured to support a work piece, a y-axis alignment assembly having a first direction of travel and mounted to the machine base, and an electrode alignment assembly mounted to the machine base and configured to hold an electrode during a machining process. The electrode alignment assembly has a second, a third, and a fourth direction of travel, and an attached rotary indexer has a fifth direction of travel. Movements in the first, second, third, fourth, and fifth directions of travel are automatically controlled by a processor.

15 Claims, 4 Drawing Sheets

1

METHODS AND APPARATUS FOR MACHINING A WORK PIECE

BACKGROUND OF THE INVENTION

This invention relates generally to machining and, more particularly, to using an electric discharge machine to machine a work piece.

Electric discharge machining is a process for machining electrical parts and power generation hardware, particularly when high precision is required. High precision machining enhances the efficiency and performance of the parts and work hardware. Precision machining is not only desired for small components, but is needed for larger power generation hardware which is heavy and awkward to handle.

Electric discharge machines typically include a working tank in which the work piece is at least partially submerged in a dielectric liquid. Since at least a portion of the work piece is submerged, the physical size of the work piece is limited by the interference of the working tank. Tanks are typically configured to receive light work pieces and are not sized to accommodate large, heavy work pieces. As a result, larger and heavier work pieces must be tooled and machined using manual tooling and machining methods. Such methods are laborious, depend on the skill of the operator, and are expensive and slow.

BRIEF SUMMARY OF THE INVENTION

In an exemplary embodiment, an electric discharge machine includes a machine base configured to support large and heavy work pieces in comparison to known systems. The machine base includes a y-axis alignment assembly having a first direction of travel and mounted to the machine base, an electrode alignment assembly mounted to the machine base which is configured to receive an electrode during a machining process and has a second, a third, and a fourth direction of travel. Additionally, the machine base includes a rotary indexer configured to support the work piece and moves in a fifth direction of travel.

In operation, the electric discharge machine is automatically controlled by a computer which includes a processor for controlling a plurality of servo drives. The servo drives are connected to the y-axis alignment assembly and the electrode alignment assembly and control the movement of the electrode and the work piece in the first, second, third, fourth, and fifth directions of travel. The electric discharge machine eliminates more costly and more complicated known machining equipment and is highly precise, reliable, cost-effective, and is configured for machining large and heavy work pieces.

DETAILED DESCRIPTION OF THE INVENTION

Figure 1:
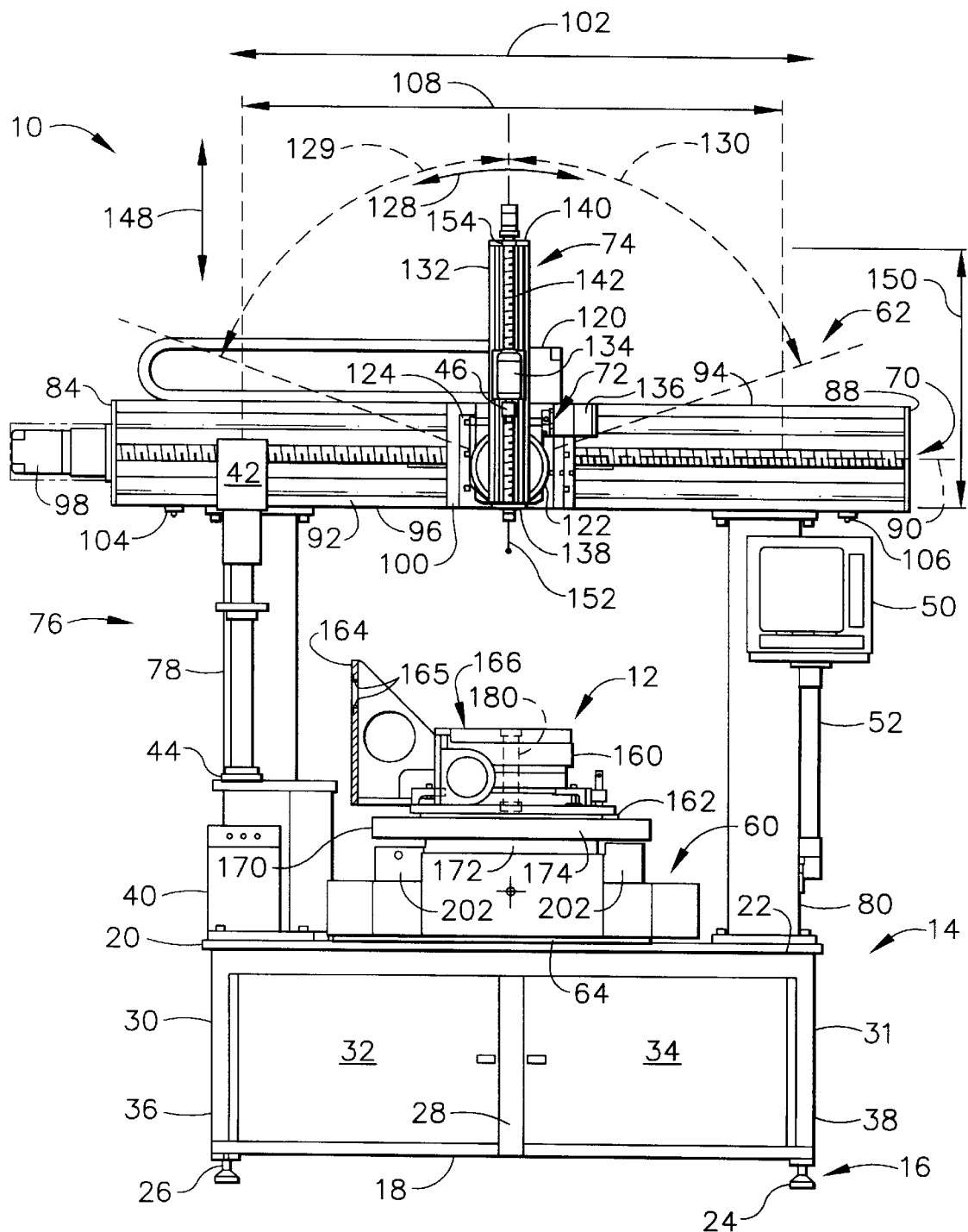
FIG. 1 is a front view of an electric discharge machine including a rotary indexer.

FIG. 1 is a front view of an electric discharge machine 10 including a rotary indexer 12, and a machine base 14.

Machine base 14 includes a leveling system 16, a cabinet 18, and a worktable 20 mounted to a top 22 of cabinet 18. Leveling system 16 includes a plurality of leveler pads 24 which extend from cabinet 18 and are attached to cabinet 18 with threaded members 26. Rotating leveler pads 24 in a counter-clockwise direction causes leveler pads 24 to retract in a direction towards to cabinet 18 and rotating leveler pads 24 in a clockwise direction causes leveler pads 24 to extend away from cabinet 18 towards a floor 26. As such, leveling system 16 can be adjusted such that worktable 20 is substantially level.

Worktable 20 is substantially flat, is mounted to top 22 of cabinet 18, and is configured to support a work piece (not shown). In one embodiment, worktable 20 is precision lapped and is constructed from granite which provides additional electrical insulation to electric discharge machine 10.

Cabinet 18 includes a front side 29 and a back side (not shown in FIG. 1) which is connected to front side 29 with a pair of side walls 30 and 31. Cabinet 18 also includes a bottom side (not shown in FIG. 1) and top 22. Front side 29 includes a pair of doors 32 and 34 which are hingedly connected to front side 29 and which provide access to a cavity area (not shown) formed by front side 29, side walls 30 and 31, the back side, the bottom, and top 22. Cabinet 18 has a first side 36 and a second side 38 and is substantially rectangular in shape.

An electrode changer control 40 is mounted adjacent top 22 near cabinet first side 36. Electrode changer control 40 is electrically connected to an electrode changer 42 mounted to top 22. Electrode changer 42 is mounted to an electrode changer mounting plate 44 and is electrically connected to an electrode wear indicator (not shown) and to a computer (not shown) including a processor. In one embodiment, electric discharge machine 10 can be programmed off-line. In a further embodiment, electric discharge machine 10 is programmable with a laptop computer. In another embodiment, the processor is a full-featured computerized numerical control (CNC) controller including x-, y-, g-, and z-axis digital read-outs, an alphanumeric keypad, and machining parameter controls available from Current EDM, Inc., 2577 Leghorn Street, Mountain View, Calif. 94043.

In operation, the processor receives continuous feedback from an electrode wear indicator (not shown) regarding the useful life of an installed electrode 46 used in a machining process. As electrode 46 deteriorates, the processor signals electrode changer control 40 which activates electrode changer 42 to replace electrode 46 with a new electrode (not shown). In one embodiment, electrode changer 42 is an AEC-24 Automatic Electrode Changer available from Current EDM, Inc. Mountain View, Calif. In one embodiment, electrode 46 is a sixteen-inch diameter electrode.

Electrode changer control 40 and electrode changer 42 are electrically connected to a power supply cabinet 50 which is electrically connected to machine base 14. Power supply cabinet 50 is mounted to cable conduit 52 which is mounted to machine base cabinet 18 near second side 38. Power supply cabinet 50 shields circuit boards and other internal components (not shown). Power supply cabinet 50 also houses four separate circuit breakers (not shown) which protect machine base 14.

Machine base 14 includes a y-axis alignment assembly 60 and an electrode alignment assembly 62. Y-axis alignment assembly 60 includes a y-axis mount plate 64 mounted to machine base cabinet 18 in slidable contact with top 22. Y-axis alignment assembly 60 is configured to move mount plate 64 with respect to cabinet 18 in a substantially linear y-axis direction of travel 66 (not shown in FIG. 1). Mount plate 64 is rigid to increase the accuracy of an alignment process and the precision of the machining process. In one embodiment, mount plate 64 is a high-precision, recirculating ball slide available from Current EDM, Inc., Mountain View, Calif.

Electrode alignment assembly 62 receives electrode 46 and includes an x-axis alignment assembly 70, a theta-axis alignment assembly 72, and a g-axis alignment assembly 74. Electrode alignment assembly 62 also includes an electrode support assembly 76 which includes a first support 78 and a second support 80. First support 78 is mounted substantially perpendicularly to cabinet top 22 adjacent a corner (not shown) formed between cabinet side wall 30 and the back side. Second support 80 is mounted substantially perpendicularly to cabinet top 22 adjacent a corner (not shown in FIG. 1) formed between cabinet side wall 31 and the back side.

X-axis alignment assembly 70 has a first end 84, a second end 88, and an axis of symmetry 90. X-axis assembly alignment 70 is attached to first support 78 and second support 80 such that axis of symmetry 90 is substantially perpendicular to first support 78 and second support 80. As such, axis of symmetry 90 is substantially parallel to top 22. X-axis alignment assembly 70 includes a front surface 92, a back surface (not shown in FIG. 1) which is connected to front surface 92 with a top surface 94 and a bottom surface 96, and a pair of side surfaces (not shown in FIG. 1. Bottom surface 96 is attached to first support 78 and second support 80. An x-axis drive motor 98 is attached to the side surface near first end 84. Front surface 92 is in slidable contact with a rotary-axis cover 100 which is electrically connected to x-axis drive motor 98. X-axis drive motor 98 is electrically connected to the processor and is configured to move rotary-axis cover 100 in a substantially linear x-axis direction 102 which is substantially parallel to axis of symmetry 90. X-axis alignment assembly 70 includes a pair of limit stop assemblies 104 and 106 which are mounted near first end 84 and second end 88 respectively. Limit stop assemblies 104 and 106 provide a limit to a travel distance 108 that x-drive motor 98 can move rotary-axis cover 100. In one embodiment, travel distance 108 is equal to approximately 42 inches. X-axis drive motor 98 is electrically connected to a servo drive (not shown) which is electrically connected to the processor. In one embodiment, x-axis alignment assembly servo drive is an AC servo motor available from Current EDM, Inc., Mountain View, Calif.

Theta-axis alignment assembly 72 includes a rotary-axis motor 120, a rotary-axis mount 122, a rotary-axis assembly housing 124, and rotary-axis cover 100. Rotary-axis cover 100 is mounted to x-axis alignment assembly front surface 92 and extends from front surface 92 towards cabinet front side 29. An adaptor plate (not shown in FIG. 1) is mounted to rotary-axis cover 100. Rotary-axis assembly housing 124 is mounted to the adaptor plate and houses a rotary drive assembly (not shown). Rotary-axis motor 120 is mounted to a top surface (not shown in FIG. 1) of rotary-axis housing 124 and is electrically connected to power supply cabinet 50. Rotary-axis motor 120 is configured to move g-axis alignment assembly 74 in a substantially rotary-axis rotational direction 128 about rotary-axis mount 122. Rotary-axis motor 120 is configured to move g-axis alignment assembly 74 through an angular travel distance 129 or through an angular travel distance 130. In one embodiment, angular travel distance 129 is approximately 70 degrees, angular travel distance 130 is approximately 70 degrees, and rotary-axis mount 122 is an NSK Model 320 available from NSK Ltd., Precision Machinery & Parts Technology Centre Eng'g. Dept., X-Y Table & Direct-Drive Actuator, 78 Toriba-machi, Maebashi-shi, Gunma-ken 371, Japan.

G-axis alignment assembly 74 includes a g-axis support 132, an electrode holder assembly 134, and a g-axis motor 136. G-axis support 132 has a first end 138 and a second end 140. First end 138 is rotatably attached to rotary-axis mount 122. Electrode holder assembly 134 is configured to receive electrode 46 and is in slidable contact with a front surface 142 of g-axis support 132. G-axis motor 136 is configured to move g-axis support 132 in a substantially liner g-axis direction 148 a travel distance 150. The movement of g-axis support 132 is limited by a first limit switch 152 positioned near first end 138 of g-axis support 132 and a second limit switch 154 positioned near second end 140. In one embodiment, travel distance 150 is approximately 12 inches. G-axis motor 136 is electrically connected to power supply cabinet 50 and to the processor with interface cables (not shown) which extend through a cable guide 158. G-axis motor 136 is electrically connected to a servo drive which is electrically connected to the processor. In one embodiment, the g-axis alignment assembly servo drive is available from Current EDM, Inc., Mountain View, Calif.

Machine base 14 also includes a rotary indexer 160 mounted to cabinet 18. Rotary indexer 160 includes a base 162, a ninety-degree base 164, and a rotatable platform 166. Ninety-degree base 164 includes openings 165 and extends substantially perpendicularly from base 162. Base 162 includes a plurality of fastener assemblies (not shown) which secure base 162 to an insulator 170. When base 162 is attached to insulator 170, base 162 and rotatable platform 166 are both substantially parallel to cabinet top 22 and ninety-degree base 164 is substantially perpendicular to cabinet top 22. In one embodiment, ninety-degree base 164 is secured to insulator 170 with fastener assemblies (not shown) which extend through openings 165. Insulator 170 is attached to an adaptor plate 172 which is mounted to y-axis mount plate 64. A dielectric fluid drainage system 174 is attached between insulator 170 and y-axis mount plate 64. Drainage system 174 collects dielectric fluid (not shown) used in the machining process. In one embodiment, the dielectric fluid is water. Rotatable platform 166 includes a mounting system 180 which is configured to receive a work piece. In one embodiment, rotatable platform 166 is configured to receive work pieces weighing 200-pounds.

Figure 2:
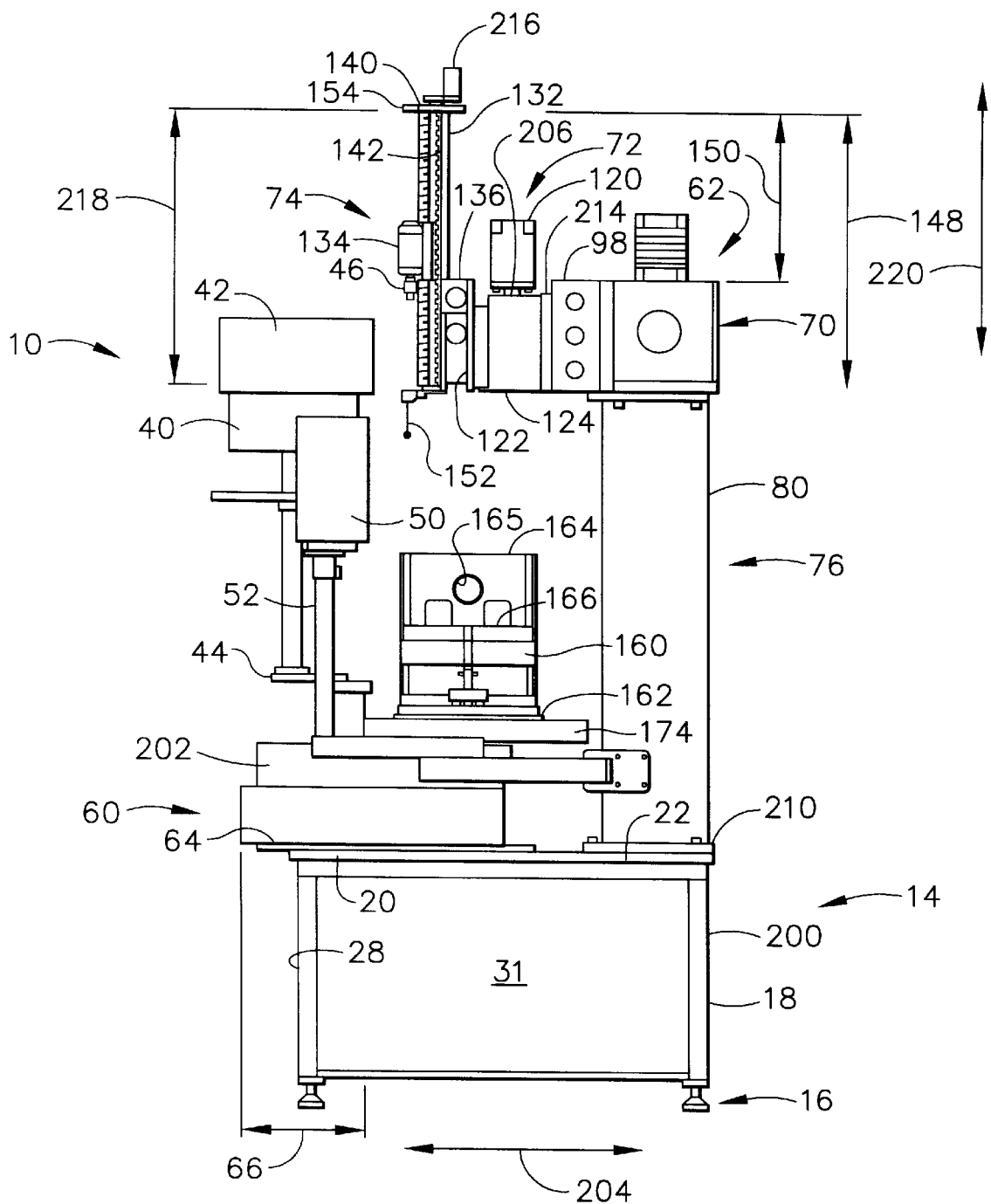
FIG. 2 is a side view of the electric discharge machine shown in FIG. 1.

FIG. 2 is a side view of electric discharge machine 10 including machine base 14. Machine base 14 includes y-axis alignment assembly 60, electrode alignment assembly 62, rotary indexer 160, and cabinet 18 which includes leveling system 16. Cabinet 18 also includes front side 29, a back side 200, and side walls 31 and 30 (shown in FIG. 1) which connect front side 29 to back side 200.

Electrode changer 42 is mounted to electrode changer mounting plate 44. Power supply cabinet 50 is electrically connected to machine base 14 and is mounted to cable conduit cabinet 52 which extends from cabinet top 22. Y-axis alignment assembly 60 is mounted to top 22 and includes y-axis mount plate 64 which is in slidable contact with top 22. A y-axis drive motor 202 is configured to move y-axis mount plate in a substantially linear y-axis direction 204 and a travel distance 66. In one embodiment, travel distance 66 is approximately 14 inches. Y-axis drive motor 202 is electrically connected to a servo drive (not shown) which is electrically connected to the processor (not shown). In one embodiment, y-axis alignment assembly servo drive is available from Current EDM, Inc., Mountain View, Calif.

Electrode alignment assembly 62 includes electrode support assembly 76 which includes first support 78 (not shown in FIG. 2) and second support 80. Second support 80 is mounted substantially perpendicular to cabinet top 22 in close proximity to a corner 210 formed between cabinet side wall 31 and back side 200. X-axis assembly 70 is mounted to electrode support assembly 76 and theta-axis alignment assembly 72 is mounted to x-axis assembly 70. Theta-axis alignment assembly 72 includes rotary-axis motor 120 mounted to a top surface 206 of rotary-axis assembly housing 124. Theta-axis alignment assembly 72 also includes rotary-axis mount 122, rotary-axis assembly housing 124, and rotary-axis cover 98. Theta-axis alignment assembly 72 is mounted to an adaptor plate 214 which is mounted to x-axis assembly 70.

G-axis alignment assembly 74 is slidably mounted to theta-axis alignment assembly 72. G-axis alignment assembly 74 includes g-axis support 132, electrode holder assembly 134, and g-axis motor 136. G-axis motor 136 is configured to move g-axis support 132 travel distance 150 in a g-axis direction 148. Electrode holder assembly 134 is configured to receive electrode 46 and is in slidable contact with g-axis support 132. A z-axis motor 216 is configured to move electrode holder assembly 134 with respect to g-axis support 132 a travel distance 218 in a z-axis direction 220 on g-axis support 132. Z-axis motor 216 is electrically controlled by a servo (not shown). Z-axis direction 216 is substantially parallel to g-axis direction 148

In operation, a work piece (not shown) is attached to rotary indexer mounting system 180. Once the work piece is secured to rotary indexer 160, the processor (not shown) adjusts the position of the work piece with respect to cabinet 18 by adjusting the servo drives which control the movement of y-axis alignment assembly 60. Additionally, the processor can change the orientation of the work piece by adjusting the servo drives which control the movement of rotary indexer rotary platform 166. The position of electrode 46 can also be adjusted by the processor. The processor can automatically adjust the position of electrode 46 by adjusting the servo drives which control the movement of x-axis alignment assembly 70, theta-axis alignment assembly 72, and g-axis alignment assembly 74. After the processor adjusts the position of g-axis alignment assembly 74, the processor adjusts the position of electrode holder assembly 134 by controlling the servo drive which controls the movement of electrode holder assembly 134.

Figure 3:
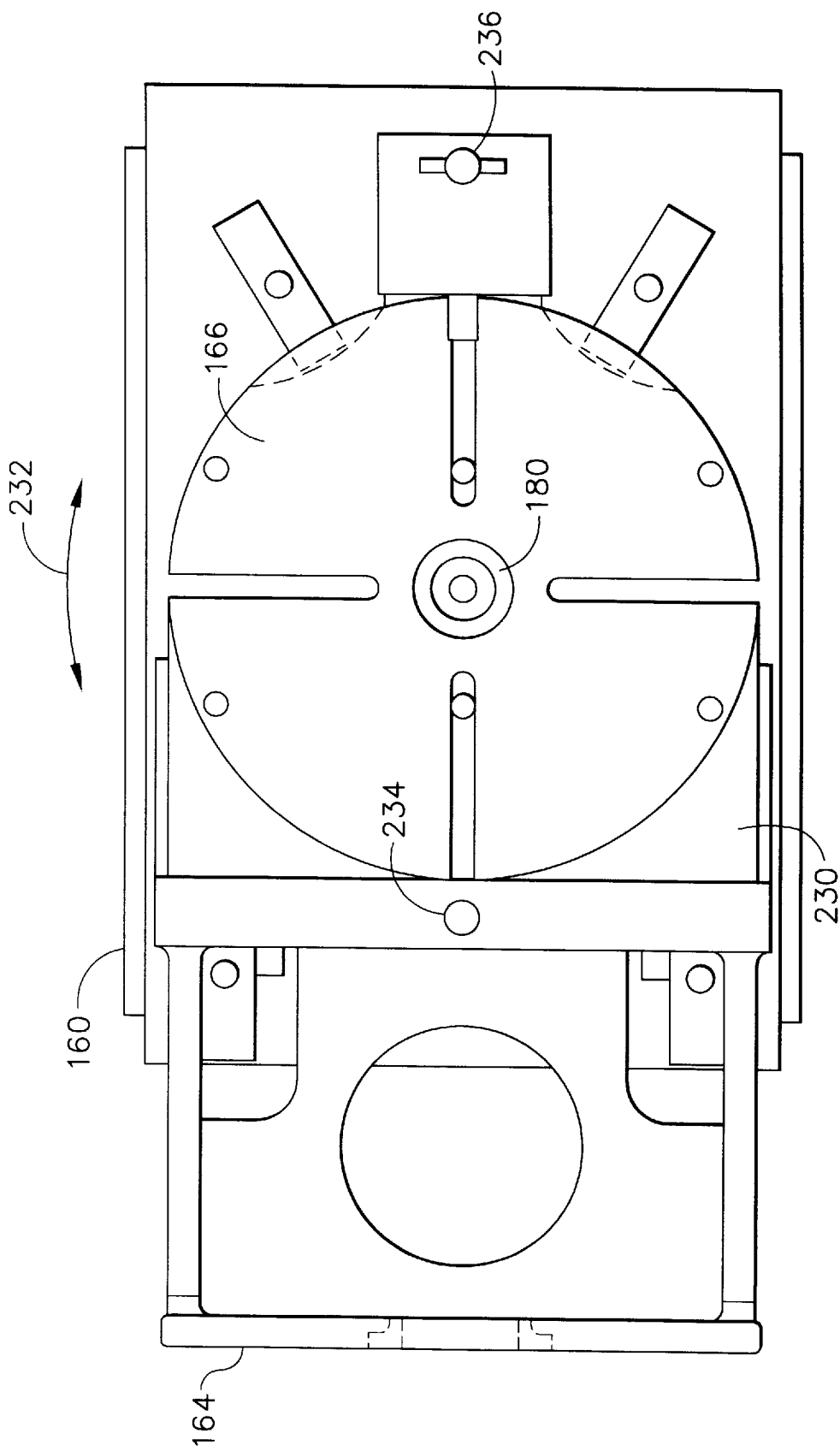
FIG. 3 is top view of the rotary indexer shown in FIG. 1.

FIG. 3 is a top view of rotary indexer 160 and includes rotary platform 166 which includes mounting system 180, and ninety-degree base 164. A rotary head drive 230 is mounted to rotary indexer 160 and is electrically connected to power supply panel 50 (not shown in FIG. 3). Rotary head drive 230 is configured to rotate rotary platform 166 and as such, simultaneously rotates the work piece attached to rotary platform 166. In one embodiment, rotary head drive 230 is configured to rotate rotary platform 166 approximately 360 degrees in a rotary-axis direction 232 and is an NSK Model 320 available from available from NSK Ltd., Precision Machinery & Parts Technology Centre Eng'g Dept., X-Y Table & Direct-Drive Actuator, 78 Toriba-machi, Maebashi-shi, Gunma-ken 371, Japan. Rotary indexer 160 also includes a first locating pin 234 and a second locating pin 236 which align rotary indexer 160 parallel to x-axis direction 102.

Figure 4:
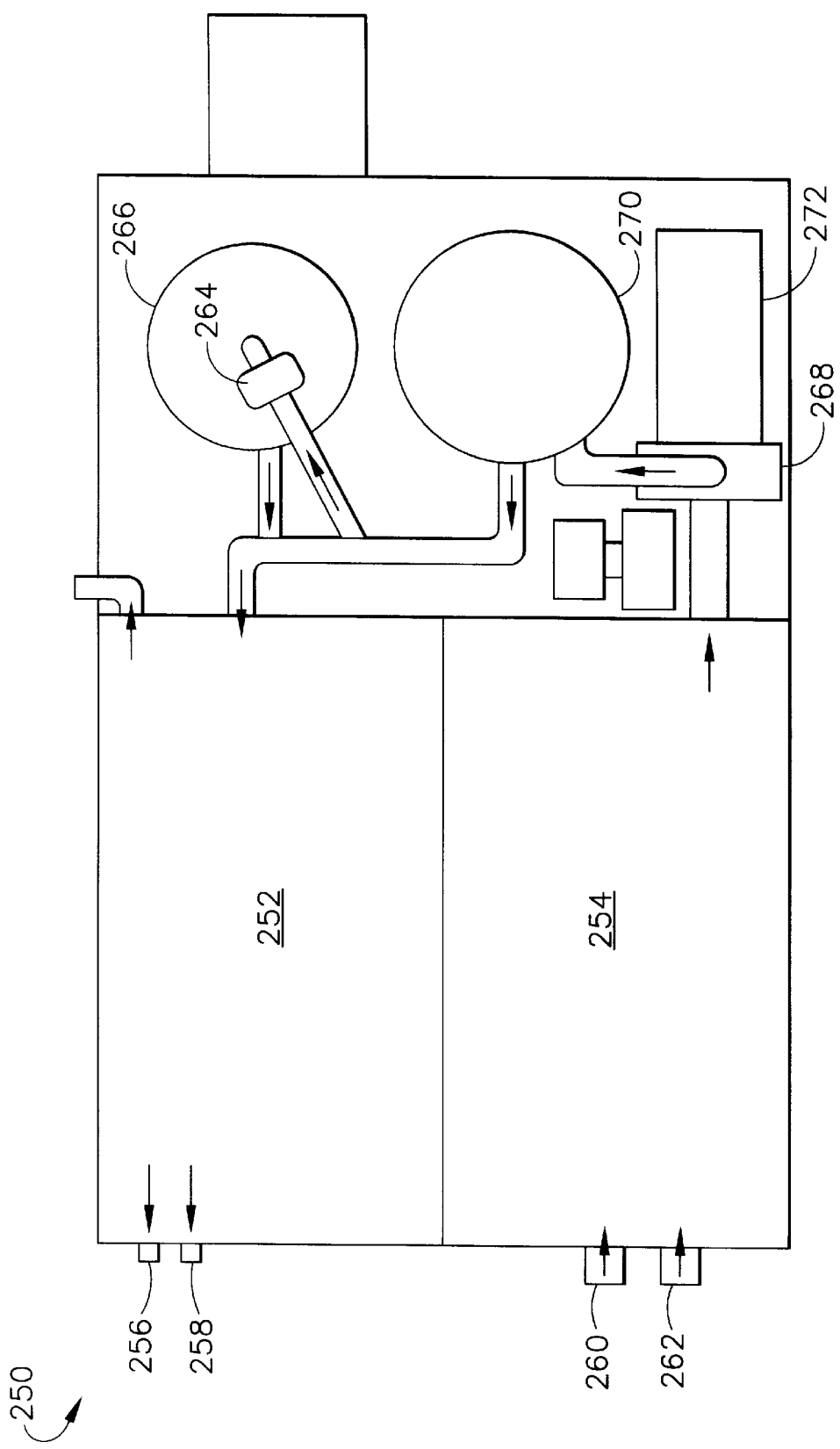
FIG. 4 is a partial side schematic view of a dielectric filtration system used with the electric discharge machine shown in FIG. 1.

FIG. 4 is a partial side schematic view of a dielectric filtration system 250 including a clean fluid reservoir 252 and a used fluid reservoir 254. Clean fluid reservoir 252 includes a pair of supply lines 256 and 258 which supply clean dielectric fluid (not shown) to electric discharge machine 10 (shown in FIG. 1). Used fluid reservoir 254 includes a pair of return lines 260 and 262 which lead from dielectric fluid drainage system 174 (shown in FIG. 1). Dielectric filtration system 250 also includes a water conductivity sensor 264 positioned within an exchange vessel 266, a pump 268 for transferring the dielectric to electric discharge machine 10, a filter canister 270 for removing impurities from the dielectric fluid, and an electric pump motor 272 for supplying pressure to pump 268.

The above-described electric discharge machine is cost-effective and highly accurate for machining small work pieces or large and heavy work pieces. The machine is capable of automatically controlling and aligning a work piece in relation to an electrode in five distinct axes. Furthermore, the machine uses positioning assemblies that are more precise and reliable when compared to other known machining systems for use with heavy, awkward, and large work pieces. As such, a cost effective and precise electric discharge machine is provided.

While the invention has been described in terms of various specific embodiments, those skilled in the art will recognize that the invention can be practiced with modification within the spirit and scope of the claims.

What is claimed is:

1. An electric discharge machine for machining a work piece, said electric discharge machine comprising:
    a machine base configured to support the work piece, said machine base comprising a y-axis alignment assembly having a first direction of travel and mounted to said machine base, an electrode alignment assembly mounted to said machine base, said electrode alignment assembly configured to receive an electrode, said electrode alignment assembly comprising an x-axis alignment assembly having a second direction of travel, a g-axis alignment assembly having a third direction of travel, and a theta-axis alignment assembly having a fourth direction of travel, said third direction of travel substantially perpendicular to said first and second directions of travel; and
    a dielectric system comprising a reservoir for storing a dielectric fluid and a pump assembly for selectively delivering said dielectric fluid to said machine base for use in machining the work piece.

2. An electric discharge machine in accordance with claim 1 wherein said machine base comprises a top and a rotary indexer mounted to said machine base, said top configured to support the work piece, said rotary indexer having a fifth direction of travel.

3. An electric discharge machine in accordance with claim 2 wherein said rotary indexer comprises a first base, a second base extending substantially perpendicularly from said first base, and a rotatable platform.

4. An electric discharge machine in accordance with claim 3 wherein said rotary indexer is mounted to said machine base such that said rotary indexer first base is substantially parallel to said machine base top and said rotatable platform is positioned substantially parallel to said machine base top.

5. An electric discharge machine in accordance with claim 3 wherein said rotary indexer is mounted to said machine base such that said rotary indexer second base is substantially parallel to said machine base top and said rotatable platform is positioned substantially perpendicular to said machine base top.

6. An electric discharge machine in accordance with claim 2 further comprising a processor comprising a memory, and a plurality of servo drives, said processor programmed to control said servo drives, said servo drives configured to control said first direction of travel, said second direction of travel, and said third direction of travel.

7. An electric discharge machine in accordance with claim 3 wherein said processor is further programmed to control said fourth direction of travel and said fifth direction of travel.

8. An electric discharge machine in accordance with claim 1 wherein said dielectric fluid comprises water.

9. An electric discharge machine in accordance with claim 1 wherein said machine base further comprises a cabinet and a granite worktable mounted to said cabinet, said granite worktable configured to support a 200-pound work piece.

10. An apparatus for machining a work piece, said apparatus comprising: an electric discharge machine for machining a work piece, said electric discharge machine comprising a machine base configured to support said work piece, said machine base comprising a y-axis alignment assembly having a first direction of travel and mounted to said machine base, and an electrode alignment assembly mounted to said machine base, said electrode alignment assembly configured to receive an electrode and comprising an x-axis alignment assembly having a second direction of travel, a g-axis alignment assembly having a third direction of travel, and a theta-axis alignment assembly having a fourth direction of travel, said third direction of travel substantially perpendicular to said first and second directions of travel.

11. An apparatus in accordance with claim 10 wherein said electric discharge machine further comprises a dielectric system and a rotary indexer, said dielectric system comprising a reservoir for storing a dielectric fluid and a pump assembly for selectively delivering said dielectric fluid to said machine base for use in machining said work piece, said rotary indexer mounted to said machine base, said top configured to support said work piece, said rotary indexer having a fifth direction of travel.

12. An apparatus in accordance with claim 11 wherein said electric discharge machine further comprises a plurality of servo drives configured to be controlled by a computer comprising a processor, said servo drives configured to control said first direction of travel, said second direction of travel, and said third direction of travel.

13. An apparatus in accordance with claim 12 wherein said dielectric fluid is water, said processor further programmed to control said said fourth direction of travel and said fifth direction of travel.

14. An apparatus in accordance with claim 13 wherein said rotary indexer comprises a first base, a second base extending substantially perpendicularly from said first base, and a rotatable platform, said rotary indexer mounted to said machine base such that said machine base is substantially parallel to said machine base top and said rotatable platform is positioned substantially parallel to said machine base top.

15. An apparatus in accordance with claim 13 wherein said rotary indexer is mounted to said machine base such that said rotary indexer second base is substantially parallel to said machine base top and said rotatable platform is positioned substantially perpendicular to said machine base top.

* * * * *